OR    3,857,627

United States
Harsch

[11] 3,857,627
[45] Dec. 31, 1974

[54] POLARIZER ARRANGEMENT FOR LIQUID CRYSTAL DISPLAYS

[75] Inventor: Thomas B. Harsch, Stow, Ohio

[73] Assignee: Hoffmann-La Roche Inc., Nutley, N.J.

[22] Filed: Aug. 29, 1973

[21] Appl. No.: 392,632

[52] U.S. Cl.............................. 350/160 LC, 350/150
[51] Int. Cl. ............................................. G02f 1/16
[58] Field of Search...................... 350/150, 160 LC

[56] References Cited
UNITED STATES PATENTS
3,731,986   5/1973   Ferguson ........................... 350/150

*Primary Examiner*—Edward S. Bauer
*Attorney, Agent, or Firm*—Brown, Murray, Flick & Peckham

[57] ABSTRACT

A liquid crystal alpha-numeric display of the field effect type comprising a layer of nematic liquid crystal material sandwiched between transparent parallel plates, together with polarizing means on opposite sides of the liquid crystal layer, and a reflector assembly behind the display. The invention is characterized in that the front polarizing means on the side of the liquid crystal layer opposite the reflector assembly covers only spaced segments of transparent conductive material which are adapted to form symbols or digits in an alpha-numeric display. In this manner, unpolarized light can pass through the front transparent plate in the area surrounding the conductive segments without being polarized, giving greater contrast between the digits or symbols of the alpha-numeric display and the background area. In another aspect, the invention can be adapted to any application where it is desired to use a patterned polarizer to produce a single image in the shape of the polarizer.

10 Claims, 4 Drawing Figures

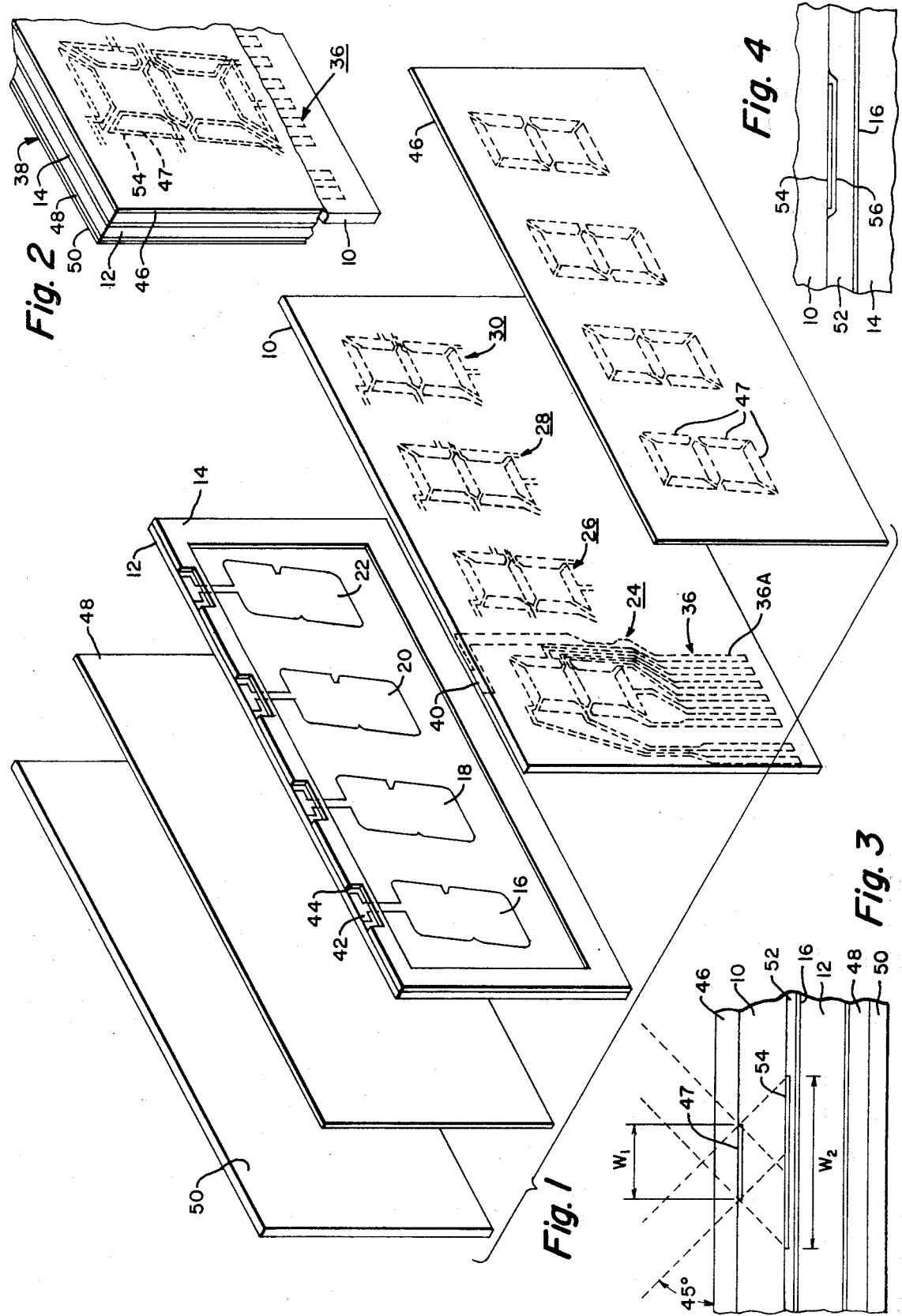

POLARIZER ARRANGEMENT FOR LIQUID CRYSTAL DISPLAYS

BACKGROUND OF THE INVENTION

As is known, liquid crystal alpha-numeric displays of the field effect type comprise a layer of nematic liquid crystal material sandwiched between transparent parallel plates coated with transparent conductive films and which are rubbed on their surfaces in contact wth the liquid crystal material to produce a twisted nematic structure. On opposite sides of the liquid crystal layer are polarizers such that when an electrical potential is established between the transparent conducting films and across the liquid crystal layer, the device will change from a light transmitting to opaque medium, or vice versa, depending upon the orientation of the two polarizers. By forming the conductive films on the front plate of the display in the shape of a desired optical image, that image can be made to appear or disappear, depending upon whether a potential is established between the conductive films. Furthermore, by creating separate conductive areas on the front plate, as by etching the conductive film thereon, any given number of conductive regions can be caused to appear opaque while other regions are not affected to produce any one of a number of different images or symbols (e.g., letters or numerals) with the same liquid crystal sandwich assembly.

A property of nematic-phase liquid crystal materials is that the molecules in the vicinity of a rubbed surface tend to align themselves with it. Thus, by rubbing the surfaces of the transparent plates in contact with the liquid crystal material, the molecules can be made to align in the direction of rubbing. Furthermore, by rubbing the surfaces of the front and rear transparent plates of the display at right angles to each other, the aforesaid twisted nematic structure will result which will rotate the plane of polarized light passing through the cell. However, by applying an electrical potential across the liquid crystal layer by means of transparent electrodes as described above, the nematic structure can be made to untwist, whereupon the plane of polarization of polarized light will no longer be rotated through 90°. Hence, by providing crossed-polarizers on opposite sides of the liquid crystal layer, light will pass through the cell with no potential applied across the liquid crystal layer, will be scattered from a reflector or at the rear of the display, and will again pass through the polarizers and the liquid crystal cell where it can be observed as a light background. Application of an electrical potential between the transparent electrodes, however, makes the area covered by the transparent electrodes opaque since in this case the nematic structure is no longer twisted and polarized light cannot pass through the cell. Of course, when the polarizers are parallel rather than crossed, light will pass through the cell only when a field is established between the transparent electrodes and will not pass through when the field is removed.

When polarized light passes through a layer of nematic liquid crystal material of the type described above, it is partially depolarized for the reason that the liquid crystal molecules are in motion, particularly at higher temperatures. Thus, while the molecules in a nematic-phase liquid crystal material tend to lie parallel to rubbed lines on a bordering surface, their parallelism is statistical, rather than perfect and exact. They are free to move and will move with respect to one another, and there are some that are at a small acute angle with respect to the "main stream" and a few others that are at any given moment in a postion even less consonant with the bulk of the others. This gives rise to the depolarization mentioned above which prevents a portion of the light from passing through the rear polarizer, resulting in a reduction in contrast between the digits or symbols of the display and the background area.

SUMMARY OF THE INVENTION

In accordance with the present invention, a new and improved liquid crystal display is provided wherein the contrast between the digits or symbols of the display and the background of the display is materially improved.

This is achieved by providing spaced strips of polarizing material covering only the spaced segments of transparent conductive material on the front transparent plate of the liquid crystal cell which form the symbols of an alpha-numeric display. Since the polarizing strips cover only the corresponding conductive segments on the front plate of the display, unpolarized light can pass through the front of the display in the areas not covered by the conductive material and strips of polarizing material. As a result, the undesirable depolarization effect on light passing from the front transparent plate to the rear transparent plate in the areas not covered by the polarizing strips is eliminated. Of course, when unpolarized light strikes the rear polarizer, it is then polarized; and some attenuation of the polarized light will occur as it is reflected from the rear reflector and passes out through the front of the display. Nevertheless, the overall contrast between the digits and the background area is materially improved.

In one embodiment of the invention shown herein, the spaced strips of polarizing material are formed by bleaching a dichoric film in all areas except the spaced strips on an acetate film or the like which is then cemented to the exposed or forward surface of the front transparent plate. Since the segments of conducting material in contact with the liquid crystal film are on the opposite side of the front plate, care must be taken such that the areas covered by the conductive segments are greater than that covered by the polarizing strips. This facilitates a wide angle view of the digits or symbols of the alpha-numeric display which would not be possible if the polarizing strips and conductive segments on opposite sides of the front transparent plate covered the same areas. That is, a twisted nematic structure can be untwisted only under the areas covered by the conductive segments; and the light must pass through a substantial thickness of the front transparent plate when viewing from an angle. Because of this thickness, the areas of the conductive segments must be greater than that of the polarizing strips in order that, when viewed from an angle, the light will not originate from an area not subjected to an electric field.

In another embodiment of the invention shown herein, both the dichoric film and the conductive films are on the same side of the front transparent plate adjacent the layer of liquid crystal material. This is achieved by applying the conductive segments and thereafter applying over the deposited segments a solution of a dye which forms a dichoric film. This film can then be leached away by masking techniques such that the dichoric film, acting as a polarizer, now covers only the conductive segments. In this latter case, the conductive segments and the dichoric films can cover the same areas since the light need not pass through the thickness of the front transparent plate in passing from the area of the conductive segment to the area of the polarizing strip.

The above and other objects and features of the invention will become apparent from the following detailed description taken in connection with the accompanying drawings which form a part of this specification, and in which:

FIG. 1 is an exploded view of the liquid crystal cell of the invention;

FIG. 2 is an end perspective view of the assembled liquid crystal cell of the invention;

FIG. 3 is a cross-sectional view of the assembled liquid crystal cell of the invention showing the relationship of the size of the polarizing strips on the front transparent plate with respect to the transparent conductive segments on the rear of the front conductive plate; and FIG. 4 is a broken-away cross-sectional view showing an alternative embodiment of the invention wherein dichoric films are deposited directly over the transparent conductive segments on the front transparent plate of the cell and in contact with the liquid crystal film.

With reference now to the drawings, and particularly to FIG. 1, the liquid crystal cell shown is of the field effect light shutter type described in U.S. Pat. No. 3,731,986. It comprises a pair of transparent plates 10 and 12, usually of glass, separated by means of a gasket 14. The gasket 14 typically has a thickness of about 0.0005 inch; while the plates themselves have a thickness typically of about 0.035 inch. In the space between the plates 10 and 12 and within the enclosure formed by the gasket 14 is a layer of liquid crystal material. The liquid crystal material is of the nematic type having a positive dielectric anistropy as taught in U.S. Pat. No. 3,731,986.

As shown in FIG. 1, the opposing surfaces of the transparent plates 10 and 12 have formed thereon patterns of transparent conductive material such as tin oxide or indium oxide. The plate 12 is provided with four patches of transparent conductive material 16, 18, 20 and 22; while the other transparent plate 10 is provided with four sets of mutually insulated strips of transparent conductive material, the four sets being identified generally by the reference numerals 24, 26, 28 and 30. When the plates 10 and 12 are bonded to opposite sides of the gasket 14, usually formed of a thermoplastic, the transparent conductive patches 16–22 will be aligned with the sets of strips 24–30 on the plate 10.

The operation of the liquid crystal cell will be described hereinafter; however it will be appreciated that when all of the strips of the set 24, for example, are opaque while the surrounding areas transmit light, the resulting configuration will represent the numeral 8. Similarly, by causing selected ones of the strips in set 24 to become opaque, any numeral from 1 through 0 can be made to appear.

The various mutually-insulated conductive strips in the sets 24–30 are adapted to be connected through a plurality of mutually-insulated strips of transparent conducting material 36 to external leads, not shown. In this respect, it can be seen from FIG. 2 that the lower end of the plate 10 with the strips 36 thereon extends beneath the remainder of the liquid crystal cell, generally indicated by the reference numeral 38, in order that a suitable electrical connector can be slipped over the lower portion of the plate 10 to connect the conducting strips 36 to external electrical circuitry, not shown. Note in FIG. 1 that the strip 36A extends from the bottom of the plate 10 all the way to the top thereof where it terminates in a horizontal portion 40 which is directly opposite a corresponding horizontal portion 42 connected to the patch 16 of electrically conductive material on plate 12. An electrically conductive epoxy material or the like is placed in an opening 44 in the gasket so as to interconnect the portions 40 and 42. With this arrangement, one terminal of a potential source can be connected to the strip 36A and, hence, to the conductive patch 16 on one side of the liquid crystal layer; while selected ones of the remaining strips 36 can be connected to the other terminal of the same potential source, thereby establishing a potential gradient resulting in an electric field across the liquid crystal material in selected areas, depending upon which ones of the strips 36 are energized (i.e., connected to the other terminal of the potential source).

In the manufacture of the liquid crystal unit, the layers of transparent conducting material that are in contact with the nematic-phase liquid crystal material must be prepared by being stroked or rubbed unidirectionally with, for example, a cotton cloth. Furthermore, the transparent conducting material on plate 10 must be rubbed unidirectionally at right angles to the direction of rubbing of the transparent conductive material on plate 12. The effect of this is to produce a twisted nematic structure in the intervening liquid crystal material as is more fully explained in the aforesaid U.S. Pat. No. 3,731,986.

In contact with the plate 10 is an acetate film 46 having formed on the inner surface thereof strips of polarizing material 47. (See also FIG. 2). As shown, the strips of polarizing material 47 are in the shape of a figure 8 and are arranged to overlie the segments of conductive material in sets 24–30. As will be seen, the length and width of the polarizing strips 47 are less than that of the conducting segments in the sets 24–30.

The polarizing strips 47 can be formed, for example, by initially applying a dichoric film on the inner side of the acetate film 46. Thereafter, the areas of the strips 47 are masked and the remainder of the dichoric film is bleached with a solution such as sodium hydroxide. After bleaching and removal of the mask, only the strips 47 remain.

On the backside of plate 12 is a second film 48 of acetate material or the like having a dichoric film applied over its entire surface so as to cover the entirety of the liquid crystal film carried between the plates 10 and 12. The planes of polarization of the strips 47 on film 46 and the dichoric film on film 48 are at right angles to each other, the plane of polarization of the strips 47 being parallel or perpendicular to the direction of rubbing of the transparent conductive material on plate 10. Behind the film 48 is a reflector 50 which can be of the type shown in copending application Ser. No. 364,037, filed May 25, 1973. It comprises a reflector which will scatter polarized light without depolarizing the same such that the display can be viewed with ambient light passing into the liquid crystal film from the front and then scattered from the reflector 50. However, instead of using a separate sheet for the reflector 50, it is also possible to incorporate powdered aluminum into a resin which is then spread onto the back of the film 48. When the resin cures, a film impregnated with powder aluminum is formed as an integral part of the back polarizer assembly. The result is the same, namely, a reflector which will scatter polarized light without depolarizing the same.

In the operation of the device, ambient light impinging on the polarizing strips 47 will pass through the forward transparent plate 10 as light polarized in the direction of rubbing of the lines on the transparent conductive material on plate 10. This polarized light, as it passes through the layer of liquid crystal material between the plates 10 and 12, will be rotated through 90° in the absence of an electrical field between the transparent conductive films; and this 90° rotation will occur throughout that area of the liquid crystal layer covered by the polarizing strips 47. The plane of polarization of polarizer 48 is at 90° with respect to that of the polarizing strips 47. Hence, with no electrical potential applied between the electrically conductive films on plates 10 and 12, the polarized light will pass through the entirety of the liquid crystal cell, will be reflected from the reflector 50, and will again pass through the polarizer 48, the liquid crystal layer and the polarizing strips 47. Under these circumstances, the entire display will appear white. The light which passes into the cell in the areas of sheet 46 around the polarizing strips 47 will, of course, not be polarized as it passes through the liquid crystal layer toward the back polarizer 48. However, as it passes through the back polarizer 48 it is polarized, thereafter scattered from reflector 50, and again passes through polarizer 48 and the liquid crystal layer.

Now, if an electrical potential, on the order of 5 volts or greater, is applied between the conducting films on the plates 10 and 12, the liquid crystal unit will no longer rotate the plane of polarization through 90° in the areas of the energized conductive segments on plate 10. Hence, under these circumstances, the polarizer 48 will block the light in the areas across which an electrical potential exists and the strips 47 will appear dark on a white background. Instead of having crossed-polarizers, it is also possible to have parallel polarizers, in which case the polarizing strips 47 on the front sheet 46 will appear dark until an electrical potential is applied between the conductive strips on the respective plates 10 and 12.

As was explained above, prior to the present invention, the entire front of the transparent plate 10 was covered with a polarizing sheet such that polarized light passed into the liquid crystal layer across its entire area. In accordance with the present invention, however, only the conductive segments of sets 24–30 are covered by the polarizing strips 47 on sheet 46. As a result, in all areas except those covered by the strips 47, unpolarized white light will pass through the front transparent plate 10 and through the liquid crystal layer and back transparent plate 12 to the rear polarizer 48 where it is polarized, following which the polarized light is scattered from the reflector 50 and again passes through the polarizer 48, the plate 12, the liquid crystal layer and the front transparent plate 10. As was mentioned above, polarized light, in passing through the liquid crystal, is partially depolarized for the reason that the liquid crystal molecules are in motion. The use of a polarizer over the sets of conducting segments 24–30 is, of course, an absolute necessity in order to provide a twisted nematic structure. However, it is not necessary in the area surrounding the conducting strips. As a result, and by eliminating the front polarizing material in all areas except those covered by the conductive segments, the attenuation of polarized light in passing from the front of the display to the back is not encountered in all areas except those covered by the polarizing strips. This provides a lighter background for the numerals formed by the sets of conducting segments 24–30.

In the embodiment of the invention thus far described, the polarizing strips 47 on the sheet 46 on the front side of the transparent plate 10; whereas the conductive segments of sets 24–30 are on the opposite side of the plate 10 in contact with the liquid crystal layer. The arrangement is shown in FIG. 3 wherein the liquid crystal layer is identified by the reference numeral 52. The conductive patch 16 is shown on the plate 12; while a typical conductive segment 54 is shown on the side of the plate 10 in contact with the liquid crystal layer 52. The dimensions of FIG. 3 are exaggerated for purposes of of illustration; however, in a typical case, the thickness of the plate 10 is about 75 times the thickness of the liquid crystal layer 52. It will be appreciated, of course, that the twisted nematic structure can be untwisted in the liquid crystal layer 52 only in the area covered by the conductive segment 54, the width of the conductive strip being identified in FIG. 3 as $W_2$. It is essential, in order to afford wide angle viewing of the digits or numerals of the alpha-numeric display, to provide the polarizing strips 47 with widths $W_1$ which are less than the widths $W_2$ of the conductive segments on plate 10 such as segment 54. In the arrangement of FIG. 3, this enables viewing of the digits of the alphanumeric display through angles of 45° on either side of a line normal to the forward face of the display. It will be understood that if the conductive segments, such as segment 54, are not of greater area than the polarizing strips 47, angle viewing cannot be achieved since, as mentioned above, the twisted nematic structure can be untwisted only under that area covered by a conductive segment. The relative sizes of the conductive segments 54 and the polarizing strips 47 are perhaps better shown in FIG. 2.

Instead of providing polarizing strips on the front surface of the plate 10 with the conductive segments on the opposite side of the plate, it is also possible to provide an arrangement such as that shown in FIG. 4. In this case, the conductive segments 54 are first applied to the inner surface of the plate 10 before assembly. Thereafter, the inner surface of the plate 10 can be rubbed and treated with a solution of a dye which forms a dichoric film as described in Dryer U.S. Pat. Nos. 2,544,659, 2,524,286 and 2,400,877. Such a solution can comprise, for example, a 4% solution of methylene blue. By coating the inner surface of the plate 10 with this dye solution and allowing it to dry, a dichoric film will be deposited on the surface with a thickness on the order of about 1 micron. Thereafter, by masking the areas covered by the conductive segments 54 and bleaching the surrounding areas with a material such as sodium hydroxide, the polarizing layer will be removed from all areas except those covering the conductive segments. The resulting structure is shown in FIG. 4 wherein the dichoric film, identified by the reference numeral 56, covers only the respective conductive segments 54. In this case, the areas covered by the conductive segments 54 and the dichoric films 56 can be substantially coextensive since light need not pass through the thickness of the plate 10 in traveling from the polarizing strip to the conductive segment and vice versa.

It is also possible to use polarizers over a dot matrix such as that shown in FIG. 5 of U.S. Pat. No. 3,731,986. In this case, the polarizers will be used on only the areas encompassed by superimposed transparent conductive dots on the rear and front plates. It is also possible in accordance with the invention to produce a desired, fixed pattern or optical image by forming the polarizer in the shape of the pattern. In this case, the electrode can cover the entire surface of the front transparent plate with the polarizer determining the pattern rather than the electrode. Assuming that the front and rear plates are rubbed at right angles and that the front and rear polarizing films are crossed, application of an electrical potential between the front and rear electrodes will untwist the entire nematic layer, but light will be blocked only in those areas covered by the front polarizers. In the remaining areas, the light will be polarized only by the rear polarizer and can pass through the front transparent plate without being blocked.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A liquid crystal display comprising a layer of nematic liquid crystal material disposed between front and rear transparent parallel plates, means for effecting a twisted nematic structure in said layer of nematic liquid crystal material, said plates being coated on selected areas thereof with transparent conductive material on opposite sides of said layer of liquid crystal material, the conductive material on said front plate comprising spaced segments adapted to form symbols in an alpha-numeric display when an electrical field is established between selected ones of said segments and a film of conductive material on the rear plate, polarizer means on opposite sides of said layer of liquid crystal material with the polarizer means adjacent said front plate comprising spaced strips of polarizing material covering only said spaced segments of conductive material whereby unpolarized light may pass through the front plate and the liquid crystal layer to the rear plate and its associated polarizing means in the areas not covered by said polarizing strips, and a reflector behind said rear plate and polarizing means for scattering polarized light back through the liquid crystal layer and the front plate.

2. The liquid crystal display of claim 1 wherein said strips of polarizing material are on one side of said front transparent plate while said spaced segments of conductive material are on the other side of said front plate in contact with said liquid crystal layer.

3. The liquid crystal display of claim 2 wherein said spaced segments of conductive material have greater areas than said strips of polarizing material.

4. The liquid crystal display of claim 1 wherein said polarizing strips are formed on a sheet secured to the front of said front transparent plate.

5. The liquid crystal display of claim 1 wherein said segments of conductive material are on the side of said front transparent plate facing said liquid crystal layer and said strips of polarizing material cover said conductive segments and are in contact with said liquid crystal layer.

6. A liquid crystal display comprising a layer of nematic liquid crystal material disposed between front and rear transparent parallel plates, means for effecting a twisted nematic structure in said layer of nematic liquid crystal material, said plates being coated with layers of transparent conductive material on opposite sides of said layer of liquid crystal material, front and rear polarizer means on opposite sides of said layer of liquid crystal material with the polarizer means on at least one of said plates covering only part of the total area of said layer of liquid crystal material, and a reflector behind said rear plate and rear polarizer means for scattering light passing through the liquid crystal layer back through the layer.

7. The display of claim 6 wherein said layers of transparent conductive material cover the entirety of the liquid crystal layer on opposite sides thereof.

8. The display of claim 6 wherein the polarizer means on said one plate is in the form of spaced patches.

9. The display of claim 6 wherein said one plate comprises the rear plate and the rear polarizer means covers the entirety of the rear plate.

10. The display of claim 6 wherein the polarizer means on said one plate is in the form of a desired image.

* * * * *